United States Patent
Tamura

(10) Patent No.: US 8,433,952 B2
(45) Date of Patent: Apr. 30, 2013

(54) MEMORY ACCESS CONTROL DEVICE, MEMORY ACCESS CONTROL METHOD AND MEMORY ACCESS CONTROL PROGRAM

(75) Inventor: Hideo Tamura, Yamanashi (JP)

(73) Assignee: NEC Computertechno, Ltd., Yamanashi (JP)

( * ) Notice: Subject to any disclaimer, the term of this patent is extended or adjusted under 35 U.S.C. 154(b) by 169 days.

(21) Appl. No.: 12/731,773

(22) Filed: Mar. 25, 2010

(65) Prior Publication Data

US 2010/0251018 A1   Sep. 30, 2010

(30) Foreign Application Priority Data

Mar. 27, 2009   (JP) ................................. 2009-078027

(51) Int. Cl.
*G06F 11/07*   (2006.01)
(52) U.S. Cl.
USPC .............. 714/18; 714/5.11; 714/15; 709/232
(58) Field of Classification Search .................. 714/5.11, 714/18
See application file for complete search history.

(56) References Cited

U.S. PATENT DOCUMENTS

| | | | |
|---|---|---|---|
| 6,937,606 B2* | 8/2005 | Basso et al. .................. | 370/412 |
| 7,346,699 B1* | 3/2008 | Krause et al. ................. | 709/232 |
| 2002/0156908 A1* | 10/2002 | Basso et al. .................... | 709/231 |
| 2002/0196789 A1* | 12/2002 | Patton ........................... | 370/400 |
| 2005/0044174 A1* | 2/2005 | Landin et al. ................. | 709/217 |
| 2006/0187963 A1* | 8/2006 | Basso et al. ................... | 370/474 |
| 2009/0016347 A1* | 1/2009 | Lehmann et al. ............. | 370/390 |
| 2010/0008250 A1* | 1/2010 | Nomura et al. ............... | 370/252 |

FOREIGN PATENT DOCUMENTS

| | | |
|---|---|---|
| JP | 08-329030 A | 12/1996 |
| JP | 9-297746 A | 11/1997 |
| JP | 10-136019 A | 5/1998 |
| JP | 10-336175 A | 12/1998 |
| JP | 2002-324013 A | 11/2002 |

OTHER PUBLICATIONS

Japanese Office Action for JP2009-078027 issued Mar. 14, 2011.

* cited by examiner

*Primary Examiner* — Chae Ko

(57) ABSTRACT

A memory access control device has a memory control unit and a software execution unit executing software. The memory control unit has: a data transmission unit configured to perform multicast transfer that reads a data from the memory and transmits the data to data transfer destinations through a network; a data reception unit configured to receive multicast transfer data from the network; and a reception data counter configured to indicate a number of multicast transfer data received by the data reception unit. The software execution unit instructs the memory control unit to perform a plurality of multicast transfers and then reads respective reception data counters of the data transfer destinations for each checkpoint in sequence of the software to determine completion of the plurality of multicast transfers.

6 Claims, 6 Drawing Sheets

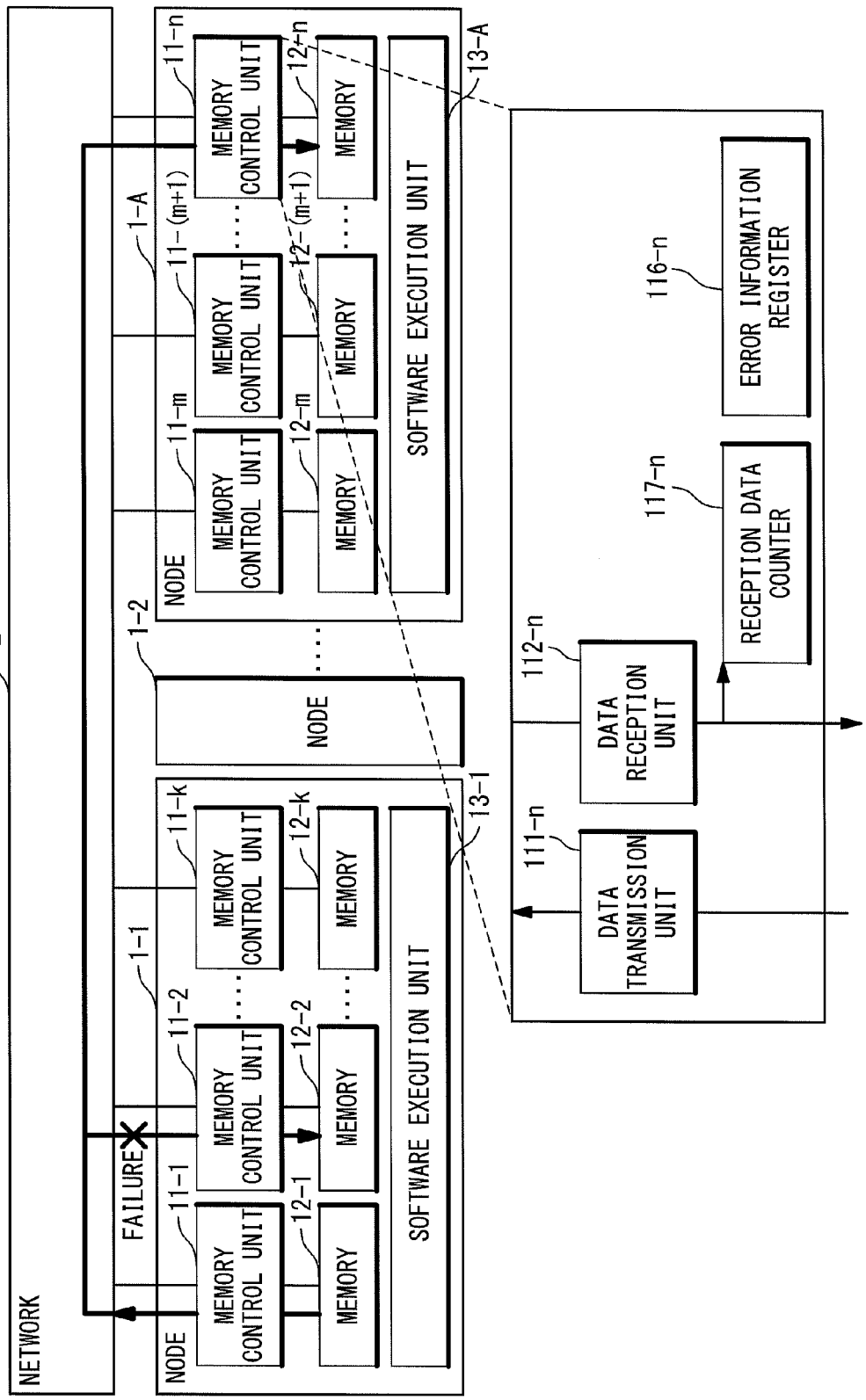

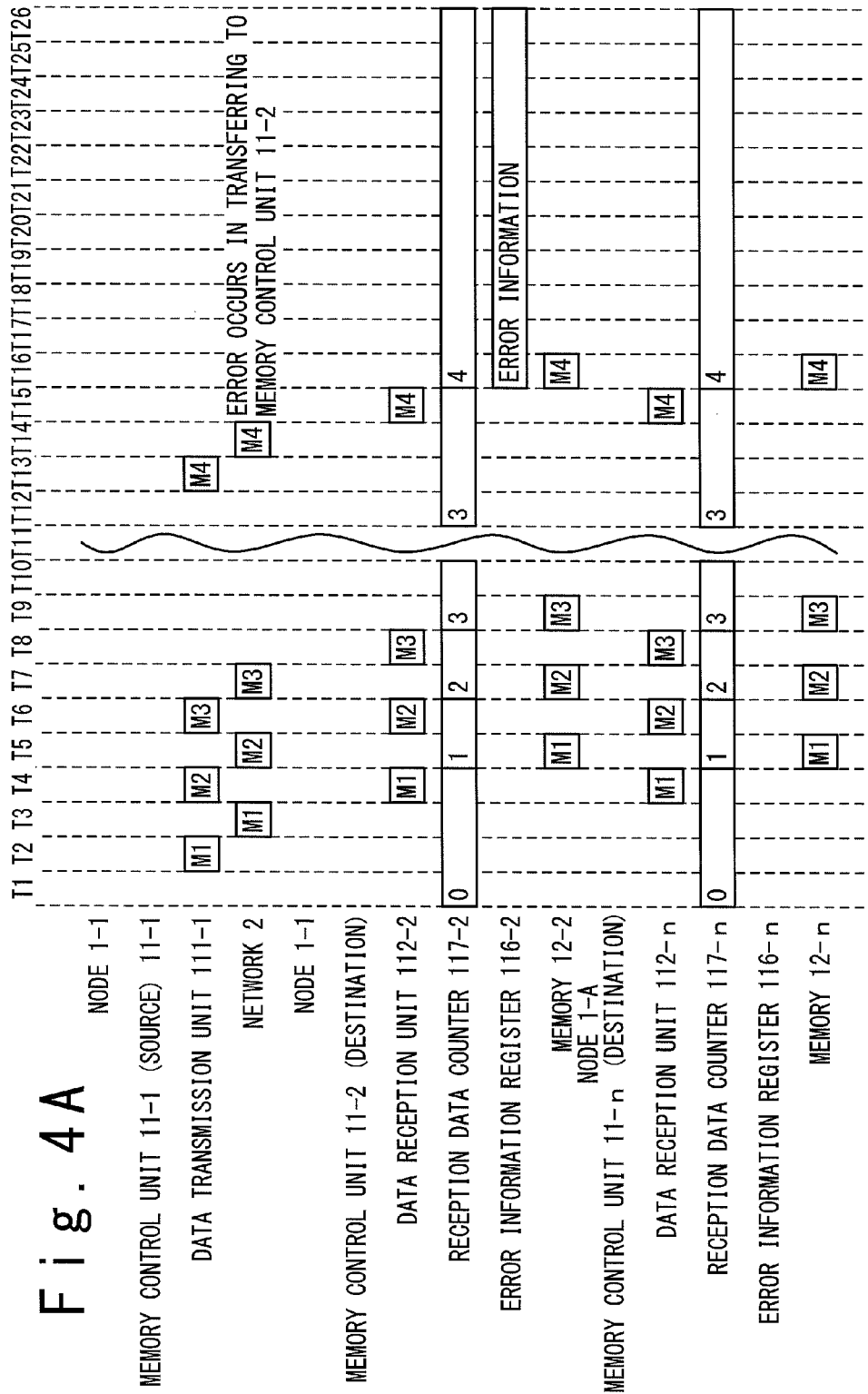

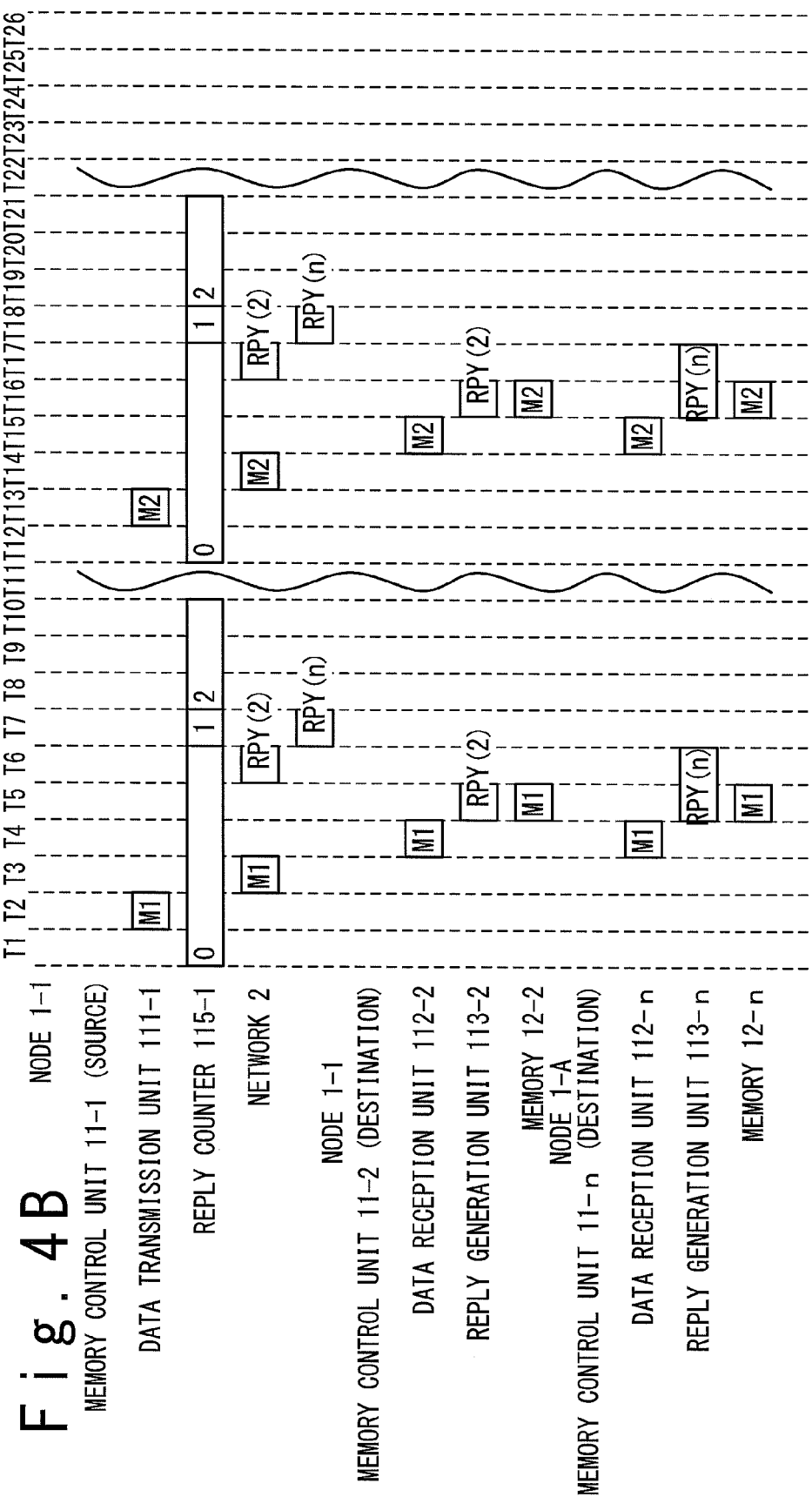

MEMORY ACCESS CONTROL DEVICE, MEMORY ACCESS CONTROL METHOD AND MEMORY ACCESS CONTROL PROGRAM

INCORPORATION BY REFERENCE

This application is based upon and claims the benefit of priority from Japanese patent application No. 2009-078027, filed on Mar. 27, 2009, the disclosure of which is incorporated herein in its entirety by reference.

TECHNICAL FIELD

The present invention relates to a memory access control technique. In particular, the present invention relates to a memory access control technique for controlling multicast transfer.

BACKGROUND ART

FIG. 1 shows a typical memory access control system having a multicast transfer function according to a related technique. The memory access control system has nodes 1 (1-x, x=1 to A: A is the number of nodes) and a network 2.

A node 1 is a unit managed by software. Each of the nodes 1 (1-x, x=1 to A) has an arbitrary number of memory control units 11, an arbitrary number of memories 12 and a software execution unit 13 (13-x, x=1 to A). The memory control units 11 and the memories 12 of all the nodes 1 are memory control units 11-i and memories 12-i (i=1 to n: n is an arbitrary number).

The memory control unit 11 (11-i, i=1 to n) performs access control of the memory 12 (12-i, i=1 to n) in the node 1 (1-x, x=1 to A). The memory 12 (12-i, i=1 to n) is a distributed memory managed by the memory control unit 11 (11-i, i=1 to n). Here, the memory control units 11 (11-i, i=1 to n) and the memories 12 (12-i, i=1 to n) have one-to-one correspondence with each other. The software execution unit 13 (13-x, x=1 to A) executes software that manages the node 1 (1-x, x=1 to A).

The network 2 includes a communication line and network devices for connecting the memory control units 11 (11-i, i=1 to n) with each other, irrespective of the nodes 1 (1-x, x=1 to A).

Each of the memory control units 11 (11-i, i=1 to n) includes a data transmission unit 111 (111-i, i=1 to n), a data reception unit 112 (112-i, i=1 to n), a reply generation unit 113 (113-i, i=1 to n), a reply reception unit 114 (114-i, i=1 to n), a reply counter 115 (115-i, i=1 to n) and an error information register 116 (116-i, i=1 to n).

The memory control unit 11-1 in the node 1-1 is a data transfer source of multicast transfer. The data transmission unit 111-1 reads out a data from the memory 12-1, which is under the memory control unit 11-1, and transmits the data to the network 2. The network 2 copies the multicast transfer data and transfers the multicast transfer data to the memory control units 11-2 to 11-n which are data transfer destinations in the nodes 1-1 to 1-A.

Moreover, when the data transfer is not correctly performed due to network failure and the like, the network 2 adds error information to the multicast transfer data and transfers the data to the memory control units 11-2 to 11-n. The case where the data transfer is not correctly performed due to network failure and the like includes a case where validity of data cannot be guaranteed. The memory control unit 11-1 as the data transfer source of the multicast transfer or the network 2 transferring data transmits the multicast transfer data by adding the error information for notification of trouble caused in the memory control unit 11-1 or the network 2 or on the communication path. For example, a case where errors of two bits or more are detected in ECC (Error Correcting Code) is considered. Note that the case where the data transfer is not correctly performed due to network failure and the like does not include a case where the memory control units 11-2 to 11-n break down.

The memory control units 11-2 to 11-n in the nodes 1-1 to 1-A are data transfer destinations. The data reception units 112-2 to 112-n respectively receive the multicast transfer data. Then, the data reception units 112-2 to 112-n respectively store the received data in the memories 12-2 to 12-n under the memory control units 11-2 to 11-n and send reply generation requests to the reply generation units 113-2 to 113-n. In response to the reply generation requests, the reply generation units 113-2 to 113-n respectively return replies to the memory control unit 11-1 which is the data transfer source.

The reply reception unit 114-1 of the memory control unit 11-1 receives the replies. The reply reception unit 114-1 increments ("+1") the reply counter 115-1 each time it receives the reply. Moreover, if error information is added to the multicast transfer data, the reply reception unit 114-1 registers the error information in the error information register 116-1.

As described above, it is necessary for the data transfer destination to return a reply to the data transfer source in the case of the memory access control system having the multicast transfer function shown in FIG. 1.

As an example of the memory access control system having the multicast transfer function, Japanese Patent Publication JP-H08-329030A (Patent Document 1) discloses processor communication control in a multiprocessor system. The memory access control system having the multicast transfer function is provided with a processor for transmitting data by multicast transfer, a processor as a data transfer destination, and a reply communication transmission control unit in the data transfer destination for returning a reply to a data transfer source. The processor that has received a multicast transfer data needs to return a reply to the data transfer source.

This related technique is disadvantageous in the following problems.

The first problem is that a great number of replies are caused in a case of a large-scale configuration where there are lots of destinations of the multicast transfer. This imposes heavy load on the transfer path, which deteriorates communication performance. Moreover, the processor as the data transfer source that has transmitted the multicast transfer data needs to process the great number of replies received, which can deteriorate command processing performance of the processor itself.

The second problem is that software needs to confirm completion of the multicast transfer each time the multicast transfer is performed. As mentioned above, the memory control unit has the reply counter for counting the number of received replies concerning multicast transfer. The software reads the reply counter of the data transfer source each time the multicast transfer is performed and thereby recognizes completion of the multicast transfer. In other words, the software needs to perform completion check each time the multicast transfer is performed. For this reason, operation of the software becomes complicated.

The third problem is that the software managing the memories in the respective data transfer destinations cannot individually check completion of the multicast transfer. The software which has performed a multicast transfer needs to notify the other software of the completion of the multicast transfer.

As a related technique, Japanese Patent Publication JP-2002-324013P (Patent Document 2) discloses a reception-side apparatus of a data transfer system. In this related technique, the number of pieces of received data is checked following reception of a single packet of data. When the number of pieces of data is correct, the data is stored in a memory and processing is repeated until reception of all the pieces of data is finished. When the number of pieces of data is wrong, retransmitting of identical data is requested to a transmitting-side unit. After resent data is received, the number of pieces of the resent data is checked again. When the number of pieces of the recent data is correct, the data is stored in the memory. When the number of pieces of the resent data is wrong on the other hand, a reset command is sent to the transmitting-side unit by using a method different from a packet method. After transmitting a reset command, error handling is performed and the processing is ended.

SUMMARY

In the related technique shown in FIG. 1, the replies from all the data transfer destinations to the data transfer source cause heavy load, which deteriorates performance.

In an exemplary aspect of the invention, a memory access control device is provided. The memory access control device has: a memory; a memory control unit configured to perform access control of the memory; and a software execution unit configured to execute software that manages the memory and the memory control unit. The memory control unit has: a data transmission unit configured to perform multicast transfer that reads a data from the memory and transmits the read data to data transfer destinations through a network; a data reception unit configured to receive multicast transfer data from the network; and a reception data counter configured to indicate a number of multicast transfer data received by the data reception unit. The software execution unit instructs the memory control unit to perform a plurality of multicast transfers and then reads respective reception data counters of the data transfer destinations for each checkpoint in sequence of the software to determine completion of the plurality of multicast transfers.

In another exemplary aspect of the invention, a memory access control method by a memory access control device is provided. The memory access control device has: a memory; a memory control unit configured to perform access control of the memory; and a software execution unit configured to execute software that manages the memory and the memory control unit. The memory control unit has: a data transmission unit configured to perform multicast transfer that reads a data from the memory and transmits the read data to data transfer destinations through a network; a data reception unit configured to receive multicast transfer data from the network; and a reception data counter configured to indicate a number of multicast transfer data received by the data reception unit. The memory access control method includes: instructing, by the software execution unit, the memory control unit to perform a plurality of multicast transfers; and reading, by the software execution unit, respective reception data counters of the data transfer destinations for each checkpoint in sequence of the software to determine completion of the plurality of multicast transfers.

In still another exemplary aspect of the invention, a memory access control program recorded on a computer-readable medium and executed by a memory access control device is provided. The memory access control device has: a memory; and a memory control unit configured to perform access control of the memory. The memory control unit has: a data transmission unit configured to perform multicast transfer that reads a data from the memory and transmits the read data to data transfer destinations through a network; a data reception unit configured to receive multicast transfer data from the network; and a reception data counter configured to indicate a number of multicast transfer data received by the data reception unit. The memory access control program performs a memory access control method including: instructing the memory control unit to perform a plurality of multicast transfers; and reading respective reception data counters of the data transfer destinations for each checkpoint in sequence of the memory access control program to determine completion of the plurality of multicast transfers.

The conventional reply concerning the multicast transfer is not necessary in a large-scale, high-reliability multiprocessor system.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 3 is a diagram showing an example of data transfers in the memory access control system according to the present embodiment;

FIG. 4A is a diagram showing an example of timing of data transfers in the memory access control system according to the present embodiment;

FIG. 4B is a diagram showing an example of timing of data transfers in the memory access control system according to the related technique.

EXEMPLARY EMBODIMENTS

Exemplary embodiments of the present invention will be described below with reference to the attached drawings.

Figure 2:
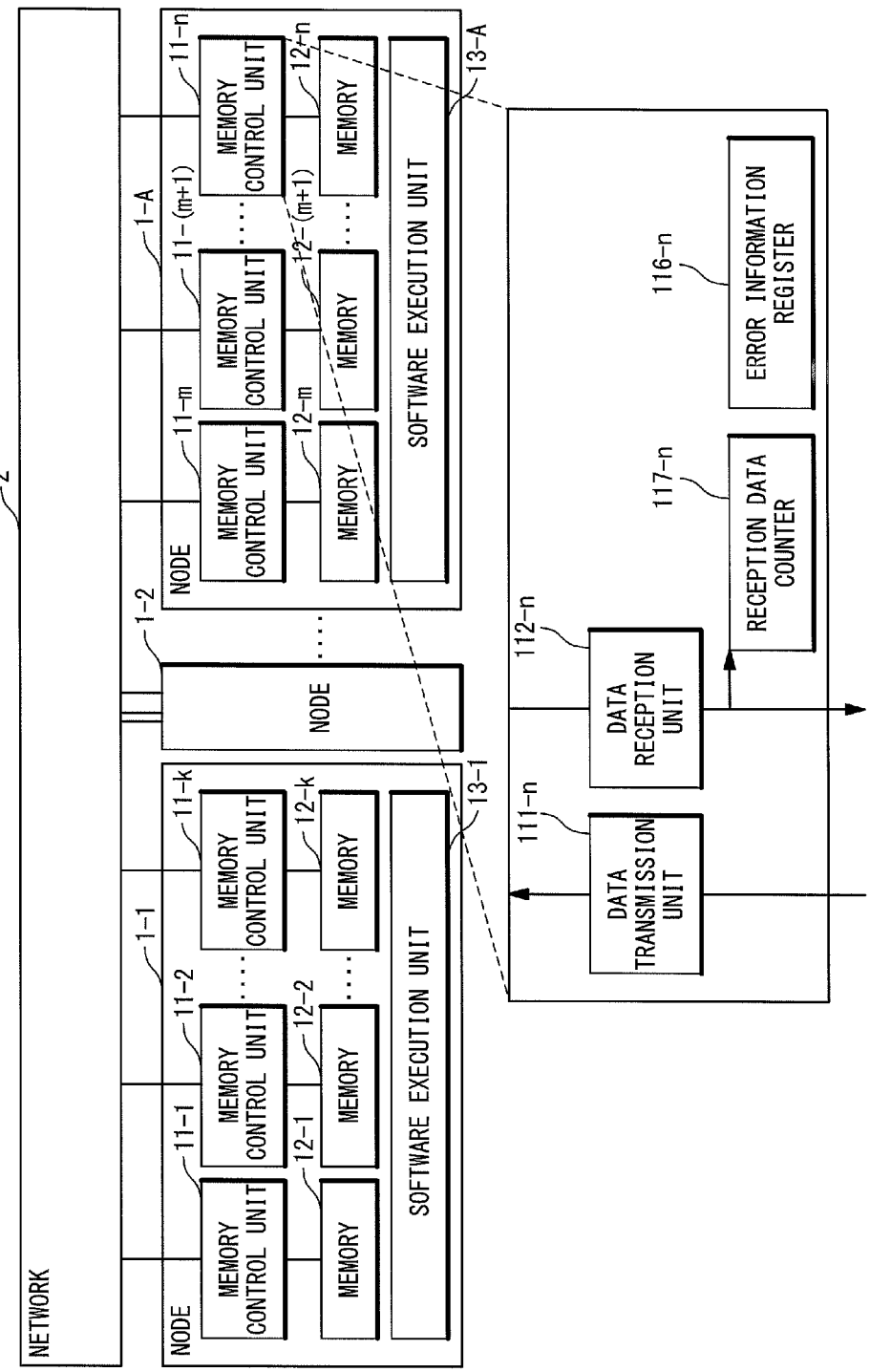
FIG. 2 is a conceptual diagram showing a configuration example of a memory access control system according to the present embodiment.

FIG. 2 shows a configuration example of a memory access control system according to the present exemplary embodiment. As shown in FIG. 2, the memory access control system has nodes 1 (1-$x$, $x$=1 to A: A is the number of nodes) and a network 2.

A node 1 (memory access control device) is a unit managed by software. Each of the nodes 1 (1-$x$, $x$=1 to A) has an arbitrary number of memory control units 11, an arbitrary number of memories 12 and a software execution unit 13 (13-$x$, $x$=1 to A). The memory control units 11 and the memories 12 of all the nodes 1 are memory control units 11-$i$ and memories 12-$i$ ($i$=1 to n: n is an arbitrary number).

The memory control unit 11 (11-$i$, $i$=1 to n) performs access control of the memory 12 (12-$i$, $i$=1 to n) in the node 1 (1-$x$, $x$=1 to A). The memory 12 (12-$i$, $i$=1 to n) is a distributed memory managed by the memory control unit 11 (11-$i$, $i$=1 to n). Here, the memory control units 11 (11-$i$, $i$=1 to n) and the memories 12 (12-$i$, $i$=1 to n) have one-to-one correspondence with each other.

The software execution unit 13 (13-$x$, $x$=1 to A) executes software that manages the node 1 (1-$x$, $x$=1 to A). The software is a memory access control program that is executed by the node 1 (software execution unit 13). The software may be recorded on a computer-readable medium. The software execution unit 13 (13-$x$, $x=1$ to A) includes a hardware unit such as a CPU (Central Processing Unit) for executing the software. The software execution unit 13 (13-$x$, $x=1$ to A) may be realized by a virtual machine (VM).

The network 2 includes a communication line and network devices for connecting the memory control units 11 (11-$i$, $i=1$ to n) with each other, irrespective of the nodes 1 (1-$x$, $x=1$ to A).

Each of the memory control units 11 (11-$i$, $i=1$ to n) includes a data transmission unit 111 (111-$i$, $i=1$ to n), a data reception unit 112 (112-$i$, $i=1$ to n), an error information register 116 (116-$i$, $i=1$ to n) and a reception data counter 117 (117-$i$, $i=1$ to n).

The memory control unit 11-1 in the node 1-1 is a data transfer source of multicast transfer. The data transmission unit 111-1 reads out a data from the memory 12-1, which is under the memory control unit 11-1, and transmits the data to the network 2. The network 2 copies the multicast transfer data and transfers the multicast transfer data to the memory control units 11-2 to 11-$n$ which are data transfer destinations in the nodes 1-1 to 1-A. Moreover, when the data transfer is not correctly performed due to network failure and the like, the network 2 adds error information to the multicast transfer data and transfers the data to the memory control units 11-2 to 11-$n$.

The memory control units 11-2 to 11-$n$ in the nodes 1-1 to 1-A are data transfer destinations. The data reception units 112-2 to 112-$n$ respectively receive the multicast transfer data from the network 2. Then, the data reception units 112-2 to 112-$n$ respectively store the received data in the memories 12-2 to 12-$n$ under the memory control units 11-2 to 11-$n$. Moreover, the data reception units 112-2 to 112-$n$ respectively increment (+1) the reception data counters 117-2 to 117-$n$ for each reception of the multicast transfer data. That is to say, the reception data counter 117 (117-$i$, $i=1$ to n) indicates the number of multicast transfer data received by the data reception unit 112 (112-$i$, $i=1$ to n). For simplicity, the "reception data counter 117 (117-$i$, $i=1$ to n)" may represent numerical information itself of the counted number.

If the error information is added to the received multicast transfer data, the data reception unit 112 (112-$i$, $i=1$ to n) registers the error information to the error information register 116 (116-$i$, $i=1$ to n). That is to say, the error information register 116 (116-$i$, $i=1$ to n) stores the error information that is added to the multicast transfer data received by the data reception unit 112 (112-$i$, $i=1$ to n). For simplicity, the "error information register 116 (116-$i$, $i=1$ to n)" may represent registered information itself such as error information.

The software execution unit 13-1 executes the software to manage the node 1-1 that is the data transfer source.

More specifically, the software execution unit 13-1 instructs the memory control unit 11-1 to perform a plurality of multicast transfers. The memory control unit 11-1 performs the plurality of multicast transfers to data transfer destinations. After the instruction, the software execution unit 13-1 reads the reception data counters 117 and the error information registers 116 of the respective data transfer destinations. Here, the software execution unit 13-1 may read the reception data counters 117 and the error information registers 116 of the respective data transfer destinations, for each checkpoint in sequence of the software. Based on the respective reception data counters 117 of the data transfer destinations, the software execution unit 13-1 determines (recognizes) completion of the plurality of multicast transfers.

Based on the respective error information registers 116 of the data transfer destinations, the software execution unit 13-1 determines (recognizes) success and failure of the plurality of multicast transfers.

Each of the software execution units 13-1 to 13-A managing the data transfer destinations also determines (recognizes) the completion of the multicast transfers in the nodes 1-1 to 1-A. Specifically, after the plurality of multicast transfers are performed, the software execution units 13-1 to 13-A respectively reads the reception data counters 117-2 to 117-$n$ and the error information registers 116-2 to 116-$n$ in the memory control units 11-2 to 11-$n$ managed by the software execution units 13-1 to 13-A, and thereby determines the completion, success and failure of the plurality of multicast transfers.

Next, an operation according to the present embodiment is described with reference to a transfer diagram of FIG. 3, a timing chart of FIG. 4A and a software operational flow of FIG. 5.

Note that the transfer diagram of FIG. 3 and the timing chart of FIG. 4A show a case where multicast transfer is performed between the memory control unit 11-1 as the data transfer source and two memory control units 11-2 and 11-$n$ as the data transfer destinations. The timing chart of FIG. 4B shows a comparative example where multicast transfer is performed in the memory access control system having the multicast transfer function shown in FIG. 1. The timing chart of FIG. 4B is shown for comparison with the timing chart of FIG. 4A.

In the timing charts of FIG. 4A and FIG. 4B, "M1" to "M4" represents data (command). In the timing chart of FIG. 4B, "RPY" represents a reply.

<A Case where Data Transfer is Correctly Performed>

First, an operation in a case where data transfer is correctly performed is described with reference to the timing chart shown in FIG. 4A.

(1) Time "T2"

At a time "T2", the data transmission unit 111-1 in the memory control unit 11-1 which is the data transfer source reads a data from the memory 12-1 and transmits the read data to the network 2.

(2) Time "T3"

At a time "T3", the network 2 copies the multicast transfer data received from the memory control unit 11-1 and transfers the multicast transfer data to the memory control units 11-2 and 11-$n$ which are the data transfer destinations.

(3) Time "T4"

At a time "T4", the data reception units 112-2 and 112-$n$ in the memory control units 11-2 and 11-$n$ which are the data transfer destinations transmit the received data to the memories 12-2 and 12-$n$, respectively.

(4) Time "T5"

At a time "T5", the data reception units 112-2 and 112-$n$ increment (+1) the reception data counters 117-2 and 117-$n$ in the memory control units 11-2 and 11-$n$, respectively.

Comparative Example 1

Figure 1:
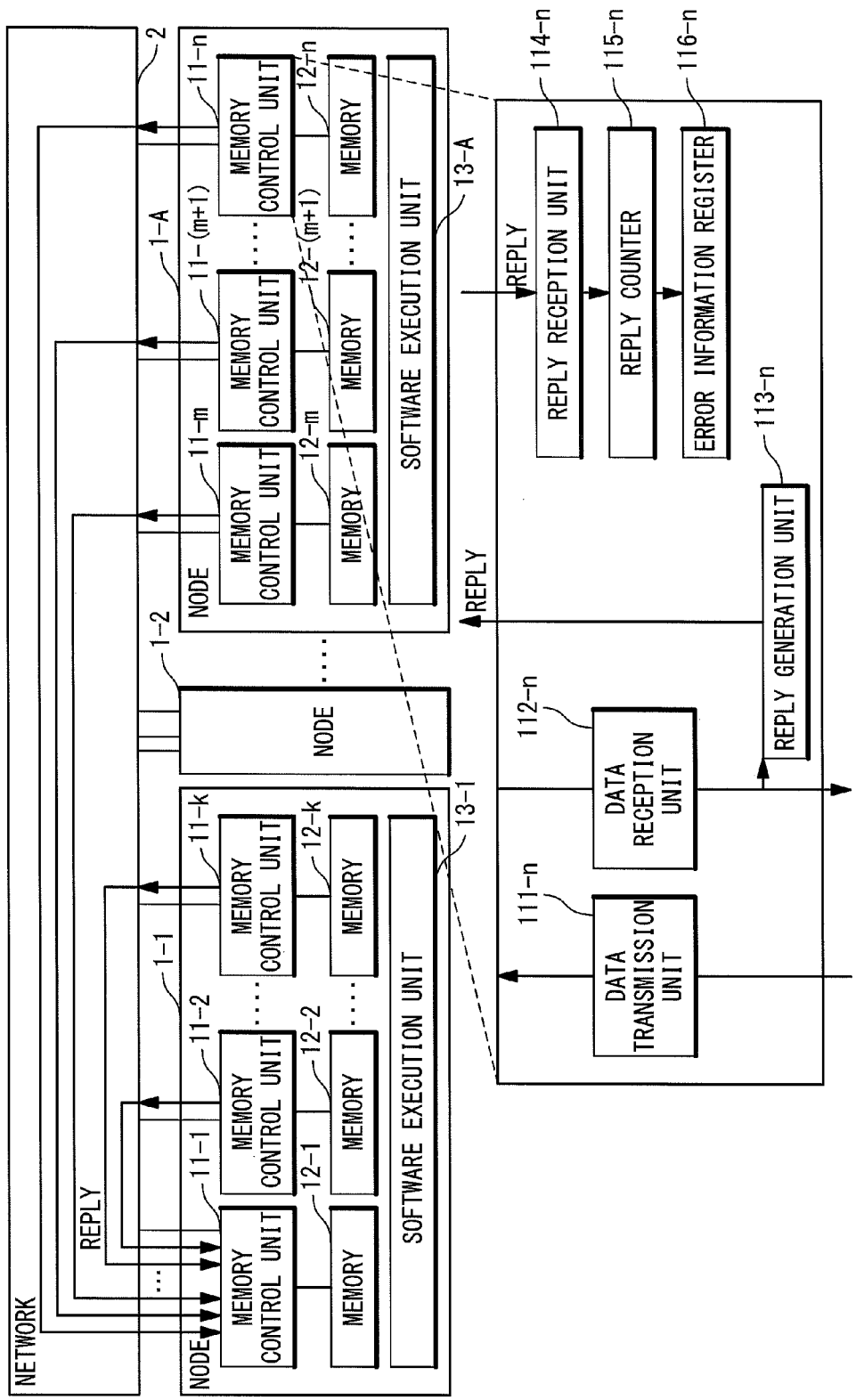
FIG. 1 is a conceptual diagram showing a configuration example of a memory access control system according to a related technique.

With reference to the timing chart shown in FIG. 4B, an operation in the case of the memory access control system shown in FIG. 1 will be described.

(1) Time "T2"

At a time "T2", the data transmission unit 111-1 in the memory control unit 11-1 which is the data transfer source reads a data from the memory 12-1 and transmits the read data to the network 2.

(2) Time "T3"

At a time "T3", the network 2 copies the multicast transfer data received from the memory control unit 11-1 and transfers the multicast transfer data to the memory control units 11-2 and 11-$n$ which are the data transfer destinations.

(3) Time "T4"

At a time "T4", the data reception units 112-2 and 112-$n$ in the memory control units 11-2 and 11-$n$ which are the data transfer destinations transmit the received data to the memories 12-2 and 12-$n$, respectively. At the same time, the data reception units 112-2 and 112-$n$ send reply generation requests to the reply generation units 113-2 and 113-$n$, respectively.

(4) Time "T5"

At a time "T5", the reply generation units 113-2 and 113-$n$ respectively generate replies "RPY (2)" and "RPY (n)" in accordance with the reply generation requests and transmit the replies "RPY (2)" and "RPY (n)" to the network 2 in order to return the replies "RPY (2)" and "RPY (n)" to the memory control unit 11-1 as the data transfer source.

(5) Time "T6"

At a time "T6", the network 2 transfers the reply "RPY (2)" received from the reply generation unit 113-2 to the memory control unit 11-1.

(6) Time "T7"

At a time "T7", the reply reception unit 114-1 in the memory control unit 11-1 as the data transfer source increments ("+1") the reply counter 115-1 in response to the reply "RPY (2)". As a result, the count value of the reply counter 115-1 changes from "0" to "1". Meanwhile, the network 2 transfers the reply "RPY (n)" received from the reply generation unit 113-$n$ to the memory control unit 11-1.

(7) Time "T8"

At a time "T8", the reply reception unit 114-1 in the memory control unit 11-1 as the data transfer source increments ("+1") the reply counter 115-1 in response to the reply "RPY (n)". As a result, the count value of the reply counter 115-1 changes from "1" to "2".

<A Case where Data Transfer is not Correctly Performed>

Next, an operation in a case where the data transfer from the network 2 to the memory control unit 11-2 is not correctly performed due to network failure will be described with reference to the timing chart shown in FIG. 4A.

(1) Time "T13"

At a time "T13", the data transmission unit 111-1 in the memory control unit 11-1 which is the data transfer source reads a data from the memory 12-1 and transmits the read data to the network 2.

(2) Time "T14"

At a time "T14", the network 2 copies the multicast transfer data received from the memory control unit 11-1 and transfers the multicast transfer data to the memory control units 11-2 and 11-$n$ which are the data transfer destinations. At this time, the network 2 adds error information to the multicast transfer data and transfers the multicast transfer data to the memory control unit 11-2.

(3) Time "T15"

At a time "T15", the data reception units 112-2 and 112-$n$ in the memory control units 11-2 and 11-$n$ which are the data transfer destinations transmit the received data to the memories 12-2 and 12-$n$, respectively.

(4) Time "T16"

At a time "T16", the data reception unit 112-2 increments (+1) the reception data counter 117-2 in the memory control unit 11-2. Moreover, the data reception unit 112-2 stores the error information in the error information register 116-2 in the memory control unit 11-2. Furthermore, the data reception unit 112-$n$ increments (+1) the reception data counter 117-$n$ in the memory control unit 11-$n$.

Comparative Example 2

With reference to the timing chart shown in FIG. 4B, an operation in the case of the memory access control system shown in FIG. 1 will be described.

(1) Time "T13"

At a time "T13", the data transmission unit 111-1 in the memory control unit 11-1 which is the data transfer source reads a data from the memory 12-1 and transmits the read data to the network 2.

(2) Time "T14"

At a time "T14", the network 2 copies the multicast transfer data received from the memory control unit 11-1 and transfers the multicast transfer data to the memory control units 11-2 and 11-$n$ which are the data transfer destinations. At this time, the network 2 adds error information to the multicast transfer data and transfers the multicast transfer data to the memory control unit 11-2.

(3) Time "T15"

At a time "T15", the data reception units 112-2 and 112-$n$ in the memory control units 11-2 and 11-$n$ which are the data transfer destinations transmit the received data to the memories 12-2 and 12-$n$, respectively. At the same time, the data reception units 112-2 and 112-$n$ send reply generation requests to the reply generation units 113-2 and 113-$n$, respectively.

(4) Time "T16"

At a time "T16", the reply generation units 113-2 and 113-$n$ respectively generate replies "RPY (2)" and "RPY (n)" in accordance with the reply generation requests and transmit the replies "RPY (2)" and "RPY (n)" to the network 2 in order to return the replies "RPY (2)" and "RPY (n)" to the memory control unit 11-1 as the data transfer source. Here, since the error information is added to the data received by the data reception unit 112-2, the reply generation unit 113-2 adds the error information to the reply "RPY (2)" and then transmits the reply "RPY (2)" to the memory control unit 11-1 as the data transfer source.

(5) Time "T17"

At a time "T17", the network 2 transfers the reply "RPY (2)" received from the reply generation unit 113-2 to the memory control unit 11-1.

(6) Time "T18"

At a time "T18", the reply reception unit 114-1 in the memory control unit 11-1 as the data transfer source increments ("+1") the reply counter 115-1 in response to the reply "RPY (2)". As a result, the count value of the reply counter 115-1 changes from "0" to "1". Moreover, since the error information is added to the received reply "RPY (2)", the reply reception unit 114-1 in the memory control unit 11-1 as the data transfer source stores the error information in the error information register 116-1. Meanwhile, the network 2 transfers the reply "RPY (n)" received from the reply generation unit 113-$n$ to the memory control unit 11-1.

(7) Time "T19"

At a time "T19", the reply reception unit 114-1 in the memory control unit 11-1 as the data transfer source increments ("+1") the reply counter 115-1 in response to the reply "RPY (n)". As a result, the count value of the reply counter 115-1 changes from "1" to "2".

Figure 5:
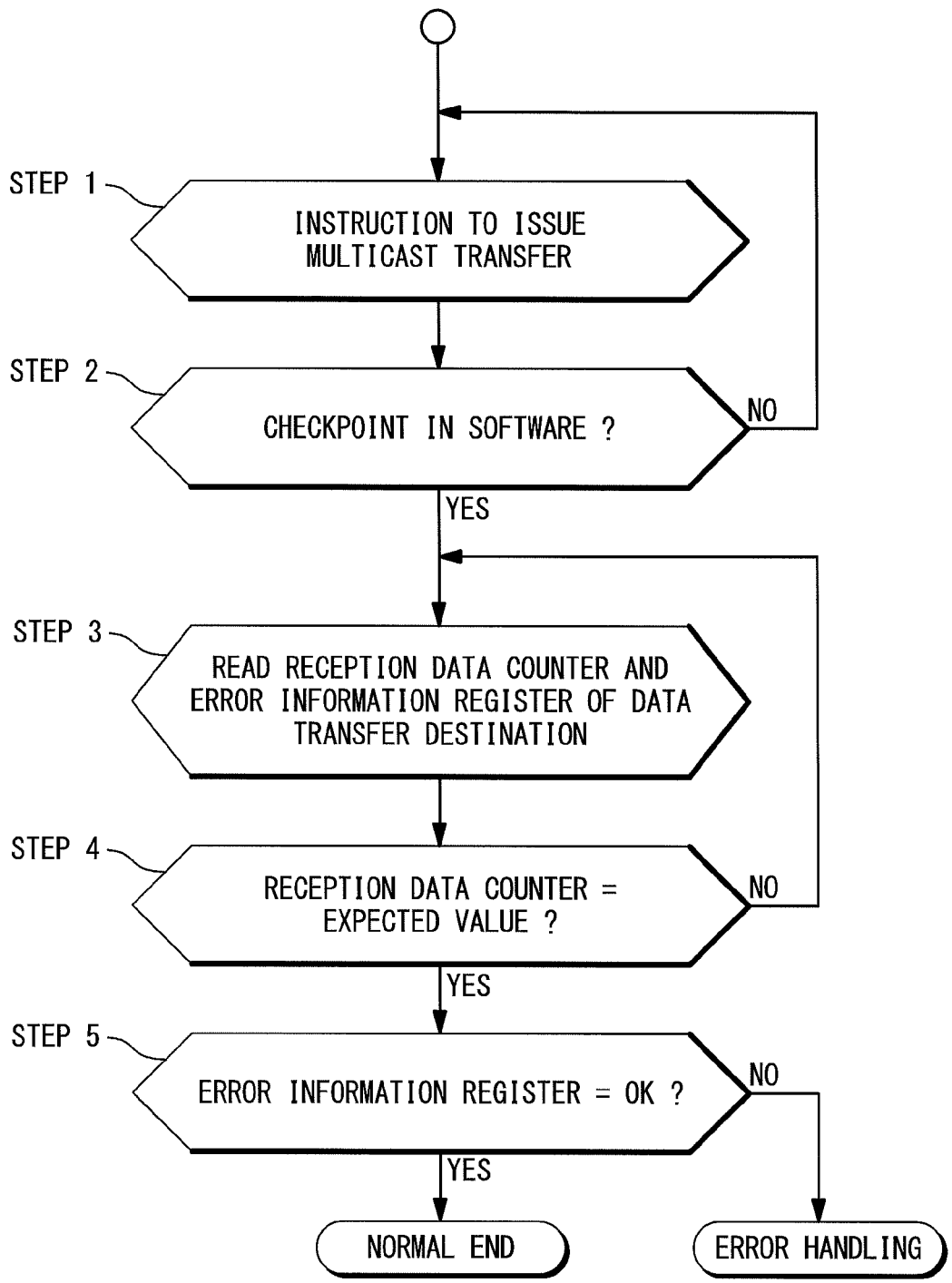
FIG. 5 is a diagram showing an example of an operation flow of software in a memory access control device according to the present embodiment.

The software operational flow in FIG. 5 shows an example of control of the software execution unit 13 (13-$x$, x=1 to A).

(1) Step 1

The software execution unit 13 (13-x, x=1 to A) instructs the memory control unit 11 (11-i, i=1 to n) to issue a multicast transfer. In accordance with the instruction, the data transmission unit 111 (111-i, i=1 to n) of the memory control unit 11 (11-i, i=1 to n) reads a data from the memory 12 (12-i, i=1 to n) and transmits the read data to the network 2.

(2) Step 2

The software execution unit 13 (13-x, x=1 to A) checks whether a sequence of the software is at a checkpoint or not. If the sequence is not at a checkpoint, the software execution unit 13 (13-x, x=1 to A) instructs the memory control unit 11 (11-i, i=1 to n) to issue a multicast transfer. In other words, the software execution unit 13 (13-x, x=1 to A) repeats the multicast transfer issuance instruction for the memory control unit 11 (11-i, i=1 to n) until the sequence of the software comes to a checkpoint.

(3) Step 3

If the sequence of the software is at a checkpoint, the software execution unit 13 (13-x, x=1 to A) reads the error information register 116 and the reception data counter 117 of the respective data transfer destinations of the multicast transfer.

(4) Step 4

The software execution unit 13 (13-x, x=1 to A) checks whether or not every reception data counter 117 of the data transfer destinations is equal to an expected value, namely the number of issued multicast transfers. If not every reception data counter 117 of the data transfer destinations is equal to the expected value, the software execution unit 13 (13-x, x=1 to A) again reads the error information register 116 and the reception data counter 117 of the respective data transfer destinations of the multicast transfer.

(5) Step 5

If every reception data counter 117 of the data transfer destinations is equal to the expected value, the software execution unit 13 (13-x, x=1 to A) checks contents of error information of the error information registers 116 of the respective data transfer destinations. If every error information register 116 of the data transfer destinations indicates no error, the software execution unit 13 (13-x, x=1 to A) determines normal end and processing is completed. On the other hand, if any error information register 116 indicates an error, the software execution unit 13 (13-x, x=1 to A) determines abnormal end and performs error handling.

According to the present embodiment, the reply concerning the multicast transfer is unnecessary. For this reason, the network load due to the replies is not caused.

Additionally, according to the present embodiment, the completion of the transfer can be recognized by checking an expected value (of the reception data counter 117 and the error information register 116) just one time with respect to a plurality of multicast transfers. For this reason, the operation of the software can be simplified.

Furthermore, according to the present embodiment, each software managing the memory 12 in the data transfer destination can individually check the completion of the multicast transfer. For this reason, the operation of the software can be simplified.

The present embodiment can be applied to the memory access control system which performs 1:n transfer.

The memory access control system of the present embodiment is characterized in that the reply concerning the multicast transfer is eliminated.

The memory access control system of the present embodiment is characterized by having a function of counting the number of multicast transfer data.

The memory access control system of the present embodiment is characterized in that the completion check for more than one multicast transfer can be performed at a time.

The memory access control system of the present embodiment is characterized in that each software can individually recognize completion of the multicast transfer within the management.

The memory access control system of the present embodiment is characterized by having a function of reducing network load concerning the multicast transfer.

The memory access control system of the present embodiment, in a memory distributed system having memories, memory control units and a network, is characterized in that a reception data counter indicating the number of received multicast transfers is provided in a memory control unit and software recognizes the completion of multicast transfers by reading the reception data counter in the data transfer destination, after more than one multicast transfer is performed.

The memory access control system of the present embodiment is characterized in that the reply concerning the multicast transfer from the data transfer destination to the data transfer source is unnecessary, and thus the network load due to the replies is not caused.

The memory access control system of the present embodiment has the reception data counters indicating the number of received multicast transfers and the error information registers indicating the error information when the data transfer is not correctly performed in the memory control units in the data transfer destinations, and recognizes the end of multicast transfers and the transfer error when the software reads the reception data counters and the error information registers of data transfer destinations after more than one multicast transfer is performed.

In the memory access control system of the present embodiment, the load on an inter-processor network due to the transfer completion check can be reduced since the transfer completion check by the software needs to be performed not for every data but only at the checkpoint of the software by counting not a number of pieces of data in a packet but the number of received data.

According to the present embodiment, the transfer completion check is possible even when packets of different commands are mixed. In the case of the related technique, the transfer completion check is impossible when packets of different commands are mixed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A memory access control device comprising:
a memory;
a memory control unit configured to perform access control of said memory; and
a software execution unit configured to execute software that manages said memory and said memory control unit,
wherein said memory control unit comprises:
a data transmission unit configured to perform multicast transfer that reads a data from said memory and transmits said read data to data transfer destinations through a network;
a data reception unit configured to receive multicast transfer data from said network;

a reception data counter configured to indicate a number of multicast transfer data received by said data reception unit; and an error information register configured to store error information that is added by said network to multicast transfer data received by said data reception unit, wherein said software execution unit of a transmitting side instructs said memory control unit of the transmitting side to perform a plurality of multicast transfers and then reads respective reception data counters of said data transfer destinations being a receiving side for each checkpoint in sequence of said software to determine completion of said plurality of multicast transfers, and wherein said software execution unit of the transmitting side reads respective error information registers of said data transfer destinations being the receiving side for each checkpoint in sequence of said software to determine success and failure of said plurality of multicast transfers.

2. The memory access control device according to claim 1, wherein said software execution unit of the transmitting side checks whether or not every reception data counter of said data transfer destinations being the receiving side is equal to the number of said plurality of multicast transfers, wherein if not every reception data counter of the receiving side is equal to the number of said plurality of multicast transfers, said software execution unit of the transmitting side reads the respective reception data counters and the respective error information registers of the receiving side again, wherein if said every reception data counter is equal to the number of said plurality of multicast transfers, said software execution unit of the transmitting side checks said error information register of the receiving side, wherein if every error information register of the receiving side indicates no error, said software execution unit of the transmitting side determines normal end, and wherein if any error information register of the receiving side indicates an error, said software execution unit of the transmitting side performs error handling.

3. A memory access control method by a memory access control device, wherein said memory access control device comprises:
a memory;
a memory control unit configured to perform access control of said memory; and
a software execution unit configured to execute software that manages said memory and said memory control unit, wherein said memory control unit comprises:
a data transmission unit configured to perform multicast transfer that reads a data from said memory and transmits said read data to data transfer destinations through a network;
a data reception unit configured to receive multicast transfer data from said network;
a reception data counter configured to indicate a number of multicast transfer data received by said data reception unit; and
an error information register configured to store error information that is added by said network to multicast transfer data received by said data reception unit, wherein the memory access control method comprises:
instructing, by said software execution unit of a transmitting side, said memory control unit of the transmitting side to perform a plurality of multicast transfers;

reading, by said software execution unit of the transmitting side, respective reception data counters of said data transfer destinations being a receiving side for each checkpoint in sequence of said software to determine completion of said plurality of multicast transfers; and reading, by said software execution unit of the transmitting side, respective error information registers of said data transfer destinations being the receiving side for each checkpoint in sequence of said software to determine success and failure of said plurality of multicast transfers.

4. The memory access control method according to claim 3, wherein said determining completion of said plurality of multicast transfers comprises:
checking, by said software execution unit of the transmitting side, whether or not every reception data counter of said data transfer destinations being the receiving side is equal to the number of said plurality of multicast transfers; and reading, by said software execution unit of the transmitting side, the respective reception data counters and the respective error information registers of the receiving side again, if not every reception data counter of the receiving side is equal to the number of said plurality of multicast transfers, and wherein said determining success and failure of said plurality of multicast transfers comprises:
checking, by said software execution unit of the transmitting side, said error information register of the receiving side, if said every reception data counter of the receiving side is equal to the number of said plurality of multicast transfers;

determining, by said software execution unit of the transmitting side, normal end, if every error information register of the receiving side indicates no error; and performing, by said software execution unit of the transmitting side, error handling, if any error information register of the receiving side indicates an error.

5. A non-transitory computer-readable medium recording a memory access control program executed by a memory access control device to transform said memory access control device such that said memory access control device comprises:
a memory; and
a memory control unit configured to perform access control of said memory;

wherein said memory control unit comprises:
a data transmission unit configured to perform multicast transfer that reads a data from said memory and transmits said read data to data transfer destinations through a network;
a data reception unit configured to receive multicast transfer data from said network;
a reception data counter configured to indicate a number of multicast transfer data received by said data reception unit; and
an error information register configured to store error information that is added by said network to multicast transfer data received by said data reception unit, wherein the memory access control program performs a memory access control method comprising:
instructing, by a transmitting side, said memory control unit of the transmitting side to perform a plurality of multicast transfers;

reading, by the transmitting side, respective reception data counters of said data transfer destinations being a receiving side for each checkpoint in sequence of said software to determine completion of said plurality of multicast transfers; and reading, by the transmitting side, respective error information registers of said data transfer destinations being the receiving side for each checkpoint in sequence of said software to determine success and failure of said plurality of multicast transfers.

6. The non-transitory computer-readable medium according to claim 5, wherein said determining completion of said plurality of multicast transfers comprises:

checking, by the transmitting side, whether or not every reception data counter of said data transfer destinations being the receiving side is equal to the number of said plurality of multicast transfers; and reading, by the transmitting side, the respective reception data counters and the respective error information registers of the receiving side again, if not every reception data counter of the receiving side is equal to the number of said plurality of multicast transfers, and wherein said determining success and failure of said plurality of multicast transfers comprises:

checking, by the transmitting side, said error information register of the receiving side, if said every reception data counter of the receiving side is equal to the number of said plurality of multicast transfers;

determining, by the transmitting side, normal end, if every error information register of the receiving side indicates no error; and performing, by the transmitting side, error handling, if any error information register of the receiving side indicates an error.

* * * * *